(12) United States Patent
Kweon et al.

(10) Patent No.: US 8,400,582 B2
(45) Date of Patent: Mar. 19, 2013

(54) LIQUID CRYSTAL DISPLAY DEVICE AND BACKLIGHT UNIT

(75) Inventors: Youngmin Kweon, Gumi-si (KR); Hoyoung Cheon, Kyungnam (KR)

(73) Assignee: LG Display Co., Ltd., Seoul (KR)

( * ) Notice: Subject to any disclaimer, the term of this patent is extended or adjusted under 35 U.S.C. 154(b) by 267 days.

(21) Appl. No.: 12/891,304

(22) Filed: Sep. 27, 2010

(65) Prior Publication Data

US 2011/0075069 A1  Mar. 31, 2011

(30) Foreign Application Priority Data

Sep. 29, 2009 (KR) .......... 10-2009-0092462

(51) Int. Cl.
*G02F 1/1335* (2006.01)

(52) U.S. Cl. ............... 349/64; 349/62; 349/65

(58) Field of Classification Search .......... 349/64, 349/65, 62
See application file for complete search history.

(56) References Cited

U.S. PATENT DOCUMENTS

| | | | | |
|---|---|---|---|---|
| 6,002,829 A | * | 12/1999 | Winston et al. | 385/146 |
| 6,154,262 A | * | 11/2000 | Ogura | 349/61 |
| 6,788,359 B2 | * | 9/2004 | Lee et al. | 349/65 |
| 6,981,776 B2 | * | 1/2006 | Lee | 362/627 |
| 7,165,874 B2 | * | 1/2007 | Nagakubo et al. | 362/623 |
| 7,213,959 B2 | * | 5/2007 | Lee | 362/611 |
| 7,360,939 B2 | * | 4/2008 | Sugiura | 362/620 |
| 7,448,787 B2 | * | 11/2008 | Kim et al. | 362/620 |
| 7,731,406 B2 | * | 6/2010 | Lee | 362/606 |
| 2004/0109105 A1 | * | 6/2004 | Nagakubo et al. | 349/65 |
| 2011/0075069 A1 | * | 3/2011 | Kweon et al. | 349/64 |

FOREIGN PATENT DOCUMENTS

| | | |
|---|---|---|
| JP | 2007-206375 | 8/2007 |
| KR | 10-2009-0019208 | 2/2009 |

* cited by examiner

*Primary Examiner* — Rhonda Peace
(74) *Attorney, Agent, or Firm* — McKenna Long & Aldridge, LLP

(57) ABSTRACT

Disclosed is a liquid crystal display including a liquid crystal panel, a light guide plate that transfers light from a light source to the liquid crystal panel and has a pattern formed on a base surface, a reflection plate that is positioned under the light guide plate and seated on a bottom cover, and a diffusing plate that is positioned between the light guide plate and the reflection plate and has a protection layer formed on a surface to face the light guide plate and a diffusing layer formed on the other surface to face the reflection plate.

9 Claims, 4 Drawing Sheets (Ref)　　　　　　　　(Emb)

LIQUID CRYSTAL DISPLAY DEVICE AND BACKLIGHT UNIT

This application claims the benefit of Korean Patent Application No. 10-2009-0092462 filed on Sep. 29, 2009, which is hereby incorporated by reference for all purposes as if fully set forth herein.

BACKGROUND OF THE INVENTION

1. Field of the Invention

This document relates to a liquid crystal display and a backlight unit.

2. Description of the Related Art

As information technologies are developed, a market for displays gradually grows up as a connection medium between users and information. Accordingly, a use of flat panel displays ("FPD"), such as liquid crystal displays ("LCDs"), organic light emitting diodes ("OLEDs"), and plasma display panels ("PDPs") also increases. Among the flat panel displays, liquid crystal displays are widely used because of high resolution and ease-to-implement a large or compact size.

Liquid crystal displays are categorized as non-emissive displays. A liquid crystal display receives light from a backlight unit that is located under a liquid crystal panel and displays an image.

The backlight unit may include optical functional layers or plates, such as, for example, a light guide plate, a reflection plate, and an optical sheet, to effective supply emitted light to the liquid crystal panel.

A scratch occurs at the conventional liquid crystal display due to friction between a protrusion formed on the base surface of the light guide plate and a diffusing layer formed on the upper surface of the diffusing plate while assembling the backlight unit. The scratch may cause the liquid crystal panel to be stained upon displaying an image.

Therefore, there is a need of an enhanced liquid crystal display and a backlight unit.

SUMMARY OF THE INVENTION

According to an embodiment of the present invention, there is provided a liquid crystal display including a liquid crystal panel; a light guide plate that transfers light from a light source to the liquid crystal panel and has a pattern formed on a base surface; a reflection plate that is positioned under the light guide plate and seated on a bottom cover; and a diffusing plate that is positioned between the light guide plate and the reflection plate and has a protection layer formed on a surface to face the light guide plate and a diffusing layer formed on the other surface to face the reflection plate.

According to an embodiment of the present invention, there is provided a liquid crystal display including a liquid crystal panel: a light guide plate that transfers light from a light source to the liquid crystal panel; a reflection plate that is positioned under the light guide plate and seated on a bottom cover; and a diffusing plate that is positioned between the light guide plate and the reflection plate, wherein the light guide plate, the reflection plate, and the diffusing plate point contact each other. According to an embodiment of the present invention, there is provided a backlight unit including a light guide plate that transfers light from a light source to an upper portion and has a pattern formed on a base surface; a reflection plate that is positioned under the light guide plate and seated on a bottom cover; and a diffusing plate that is positioned between the light guide plate and the reflection plate and has a protection layer formed on a surface to face the light guide plate and a diffusing layer formed on the other surface to face the reflection plate.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION

Reference will now be made in detail embodiments of the invention examples of which are illustrated in the accompanying drawings.

Hereinafter, embodiments of the present invention will be described in greater detail with reference to accompanying drawings.

Figure 1:
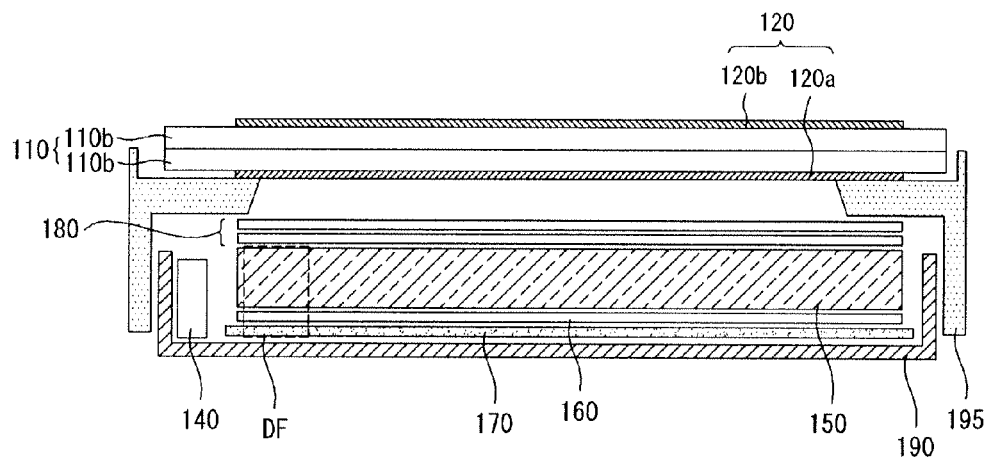
FIGS. 1 and 2 are cross section views illustrating a liquid crystal display according to an embodiment of the present invention.
Figure 2:
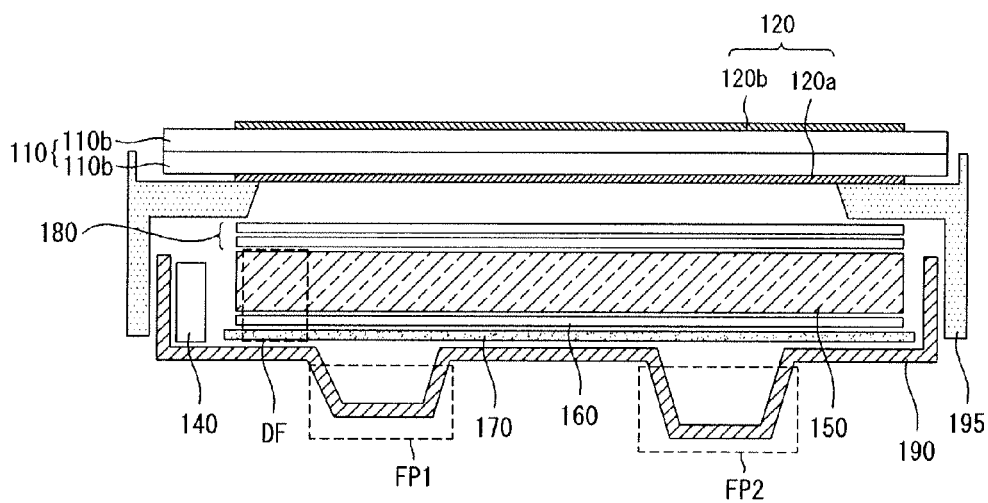

FIGS. 1 and 2 are cross section views illustrating a liquid crystal display according to an embodiment of the present invention.

Referring to FIGS. 1 and 2, the liquid crystal display includes a liquid crystal panel 110, optical sheets 180, a light source 140, a light guide plate 150, a diffusing plate 160, a reflection plate 170, a bottom cover 190, and a guide panel 195.

The bottom cover 190 accommodates the light source 140, the light guide plate 150, the diffusing plate 160, the reflection plate 170, and the optical sheets 180. The bottom cover 190 may have a flat surface on which the reflection plate 170 is seated as shown in FIG. 1. Further, the bottom cover 190 may have foaming portions FP1 and FP2, each of which protrudes in the opposite direction of the surface on which the reflection plate 170 is seated to have a step portion. The foaming portions FP1 and FP2 may reinforce the strength of the liquid crystal display or facilitate the assembly with the other components.

The light source 140 is received in the bottom cover 190 to supply light to an edge portion of the light guide plate 150. The light source 140 may include a cold cathode fluorescent lamp ("CCFL"), a hot cathode fluorescent lamp ("HCFL"), an external electrode fluorescent lamp ("EEFL"), and a light emitting diode ("LED"), but not limited to.

The light guide plate 150 transforms point light or line light emitted from the light source 140 to surface light and guides light supplied from the diffusing plate 160, which is located under the light guide plate 150, to the optical sheets 180, which are located on the light guide plate 150.

The diffusing plate 160 is located on the reflection plate 170. The diffusing plate 160 diffuses light supplied through the reflection plate 170 toward the reflection plate 170.

The reflection plate 170 is seated on the base surface of the bottom cover 190. The reflection plate 170 reflects light emitted from the light source 140 to the diffusing plate 160 located on the reflection plate 170 to minimize light loss.

The optical sheets 180 transfer light from the light guide plate 150 to the liquid crystal panel 110 that is located on the optical sheets 180. The optical sheets 180 include a diffusing sheet, a prism sheet (for example, lenticular lens sheet), and a protection sheet, but not limited to.

The guide panel 195 supports the optical sheets 180, the light source 140, the light guide plate 150, the diffusing plate 160, and the reflection plate 170, which are received in the bottom cover 190, and the liquid crystal panel 110 located on the guide panel 195.

A backlight unit may include the optical sheet 180, the light source 140, the light guide plate 150, the diffusing plate 160, the reflection plate 170, and the bottom cover 190.

The liquid crystal panel 110 includes a first substrate 110a having thin film transistors ("TFTs") and a second substrate having a color filter. A lower polarizing plate 120a is disposed on the lower surface of the liquid crystal panel 110 and an upper polarizing plate 120b is disposed on the upper surface of the liquid crystal panel 110. The polarizing plate 120 polarizes light supplied through the optical sheets 180. The liquid crystal panel 110 further includes a liquid crystal layer between the first substrate 110a and the second substrate 110b. Depending on a driving mode, the liquid crystal layer may be driven in a vertical electric field driving manner including a twisted nematic ("TN") mode a vertical alignment ("VA") mode and in a horizontal electric field driving manner including an in-plane switching ("IPS") mode and a fringe field switching ("FFS") mode.

An exemplary sectional structure of the liquid crystal panel 110 will now be described. It should be noted that the sectional structure is merely an example of a liquid crystal panel having a number of structures depending on the driving mode of the liquid crystal layer.

Figure 3:
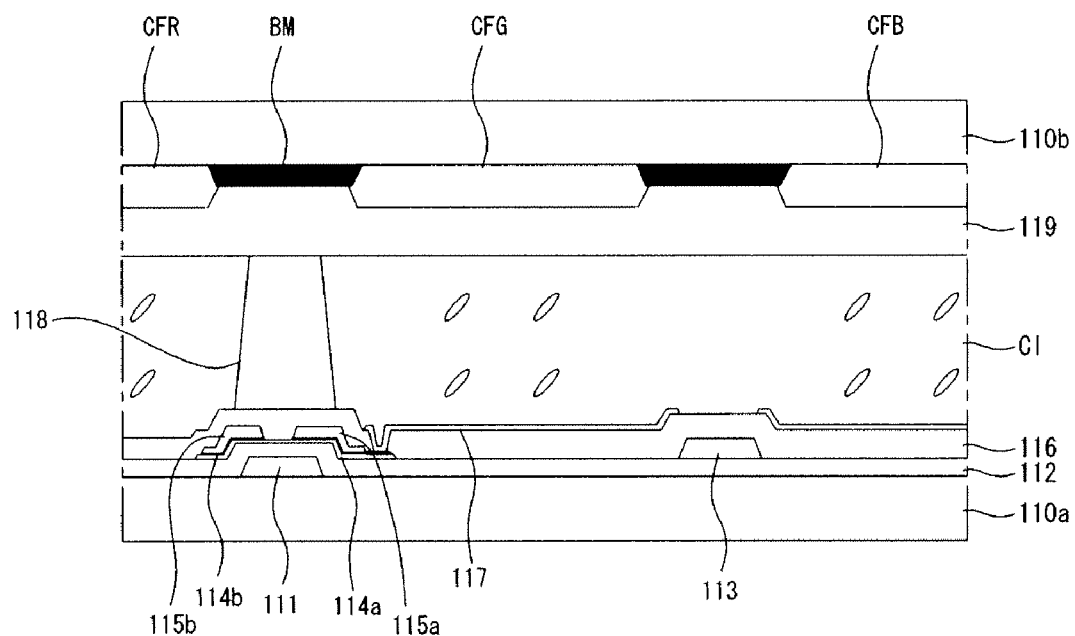
FIG. 3 is a cross section view illustrating a liquid crystal panel according to an embodiment of the present invention.

FIG. 3 is a cross section view illustrating a liquid crystal panel according to an embodiment of the present invention.

Referring to FIG. 3, a gate 111 is arranged on a surface of the first substrate 110a. The gate 111 may be a multilayer that is formed of any one selected from the group consisting of molybdenum (Mo), aluminum (Al), chromium (Cr), gold (Au), titanium (Ti), nickel (Ni), neodymium (Nd), and copper (Cu), or an alloy thereof. Further, the gate 111 may be a double layer, such as a molybdenum/aluminum-neodymium layer or a molybdenum/aluminum layer.

A first insulation film 112 is arranged on the gate 111. The first insulation film 112 may include a silicon oxide (SiOx) layer, a silicon nitride (SiNx) layer, or a multilayer thereof, but not limited to.

An active layer 114a is arranged on the first insulation film 112 to cover the gate 111 and an ohmic contact layer 114b is arranged on the active layer 114a to lower contact resistance. Further, a data line 113 may be arranged on the first insulation film 112 to receive a data voltage, but not limited to.

A source 115a and a drain 115b are arranged on the active layer 114a. The source 115a and the drain 115b may be formed in a single layer or a multilayer. When formed in a single layer, the source 115a and the drain 115b may be formed of any one selected from the group consisting of molybdenum (Mo), aluminum (Al), chromium (Cr), gold (Au), titanium (Ti), nickel (Ni), neodymium (Nd), and copper (Cu) or an alloy thereof. When formed in a multilayer, the source 115a and the drain 115b may be a double layer of molybdenum/aluminum-neodymium, or a triple layer of molybdenum/aluminum/molybdenum or molybdenum/aluminum-neodymium/molybdenum.

A second insulation film 116 is arranged on the source 115a and the drain 115b. The second insulation film 116 may include a silicon oxide (SiOx) film, a silicon nitride (SiNx) film, or a multilayer thereof, but not limited to. The second insulation film 116 may include a passivation film.

A pixel electrode 117 connected to the source 115a or the drain 115b is arranged on the second insulation film 116. The pixel electrode 117 may be a transparent electrode that is formed of indium tin oxide ("ITO"), indium zinc oxide ("IZO"), or zinc oxide (ZnO).

A common electrode (not shown) is arranged on the second insulation film 116 to face the pixel electrode 117. The common electrode may be arranged on the first substrate 110a or the second substrate 110b depending on the driving mode of liquid crystal layer. For example, In the case of a vertical electric field driving method, such as a TN mode or VA mode, the common electrode is formed on the second substrate 110b, and in the case of a horizontal electric field driving method, such as an IPS mode or FFS mode, the common electrode is formed on the first substrate 110a together with the pixel electrode 117.

A spacer 118 is arranged on the second insulation film 116 to cover the source 115a and the drain 115b. The spacer 118 maintains a cell gap between the first substrate 110a and the second substrate 110b.

Black matrixes BM are arranged on a surface of the second substrate 110b. The black matrix BM is a non-display region and may be arranged to cover the spacer 118. The black matrix BM may be formed of a photosensitive material containing a black pigment. The black pigment may include carbon black or titanium oxide.

One of color filters CFR, CFG, and CFB is positioned between two neighboring black matrixes BM. The color filters CFR, CFG, and CFB may have other colors than red of red color filter CFR, green of green color filter CFG, and blue of blue color filter CFB.

An overcoat layer 119 is disposed on the black matrixes BM and the color filters CFR, CFG, and CFB. The overcoat layer 119 may be omitted depending on a structure.

A scan driver (not shown) and a data driver (not shown) may be positioned on the first substrate 110a to supply driving signals. The drivers may be connected to data lines and gate lines that are formed on the first substrate 110a. The drivers may be included in a film circuit and connected to the liquid crystal panel 110 in the form of a chip on film ("COF") or tape carrier package ("TCP"). The drivers may also be directly mounted on the first substrate 110a in the form of a COG or embedded in the first substrate 110a in the process of forming thin film transistors. The liquid crystal panel 110 may display an image in response to scan signals supplied through the gate lines and data voltages supplied through the data lines.

A thin film transistor ("TFT") included in a sub pixel turns on upon receiving a gate high voltage from a gate line to supply a data voltage from a data line to the pixel electrode 117. As the TFT applies the data voltage to the pixel electrode 117, a difference voltage which is a difference between the data voltage and a common voltage is applied to the liquid crystal layer Cl, so that the liquid crystal panel 110 may display an image.

A liquid crystal display according to an embodiment will now be described in greater detail.

Figure 4:
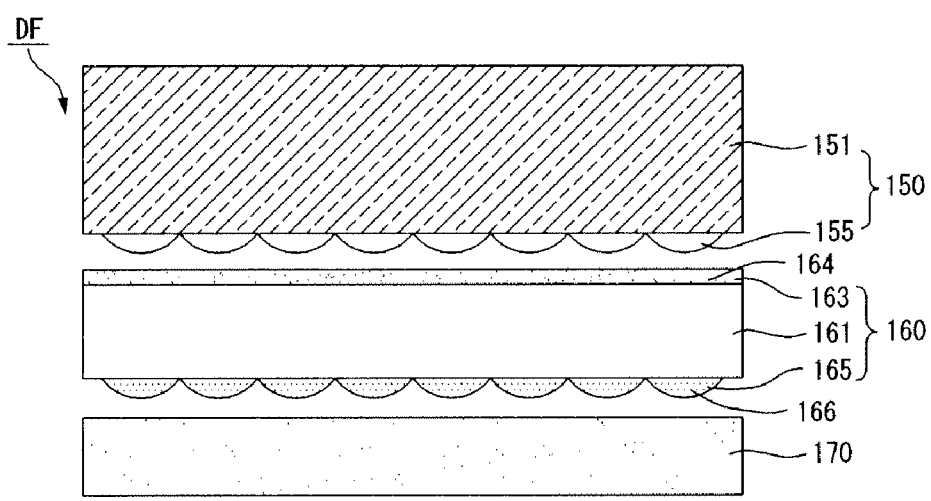
FIG. 4 is an enlarged cross section view illustrating region "DF" shown in FIGS. 1 and 2 according to an embodiment of the present invention.
Figure 5:
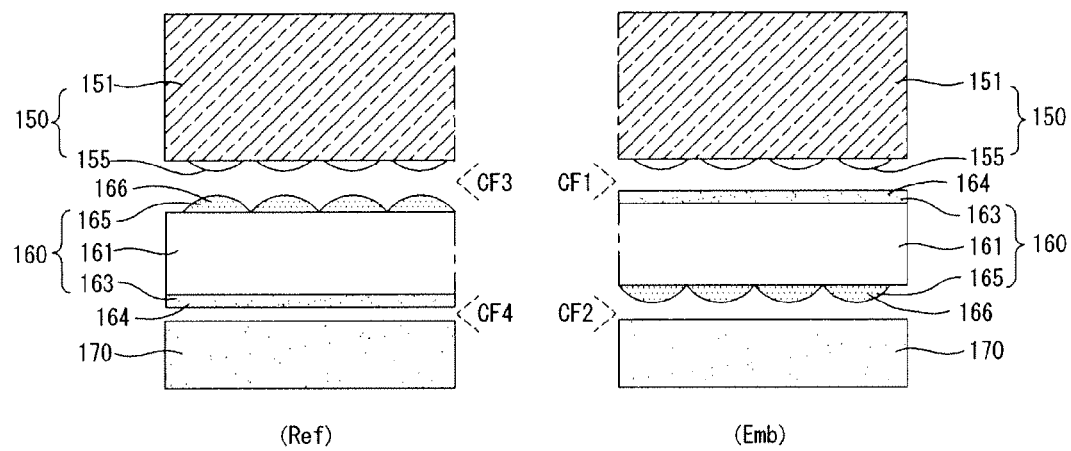
FIG. 5 is a view illustrating a structure located at region "DF".
Figure 6:
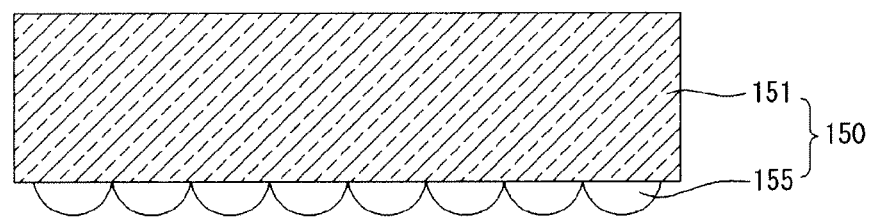
FIGS. 6 and 7 are views illustrating a light guide plate.
Figure 7:
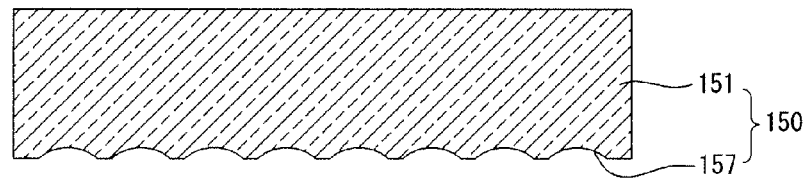

FIG. 4 is an enlarged cross section view illustrating region "DF" shown in FIGS. 1 and 2 according to an embodiment of the present invention. FIG. 5 is a view illustrating a structure located at region "DF". FIGS. 6 and 7 are views illustrating a light guide plate.

Referring to FIG. 4, the light guide plate 150 includes a base portion 151 and at least protrusion 155 that protrudes from the base surface of the base portion 151. The base portion 151 and the protrusion 155 may be formed of the same material, for example, but not limited to, polymethylmethacrylate ("PMMA"). The upper surface of the base portion 151 may be formed to be flat and the lower surface of the base portion 151 may be formed to include the protrusion 155. The protrusion 155 is a pattern to improve functionality of the light guide plate 150 and its cross section may be shaped as a semicircle that protrudes from the base portion 151, but not limited to.

The diffusing plate 160 is positioned between the light guide plate 150 and the reflection plate 170. The diffusing plate 160 includes a base film 161, a protection layer 163 that is formed on a surface of the base film 161 and faces the light guide plate 150, and a diffusing layer 165 that is formed on the other surface of the base film 161 and faces the reflection plate 170. Each of the base film 161, the protection layer 163, and the diffusing layer 165 may be formed of a resin, such as acrylic, urethane, or polyester, but not limited to. The base film 161, the protection layer 163, and the diffusing layer 165 may be formed of the same material, but not limited to. First diffusing particles 166 may be contained in the diffusing layer 165 and second diffusing particles 164 may be contained in the protection layer 163. Each of the first diffusing particles 166 is larger in size than each of the second diffusing particles 164. Accordingly, the surface of the diffusing layer 165 may be formed to be protruded more than the surface of the protection layer 163.

FIG. 5(Ref) is a cross section view illustrating part of a backlight unit according to a comparative example, and FIG. 5(Emb) is a cross section view illustrating part of a backlight unit according to an embodiment of the present invention.

Referring to FIG. 5, the comparative example and the present embodiment are identical to each other in that the diffusing plate 160 included in the backlight unit is positioned between the light guide plate 150 and the reflection plate 170, but are different from each other in the structure of the diffusing plate 160.

In the comparative example, the diffusing plate 160 is formed such that the protection layer 163 faces the surface of the reflection plate 170 and the diffusing layer 165 faces the protrusion 155 of the light guide plate 150. On the contrary, in the embodiment, the diffusing plate 160 is formed such that the protection layer 163 faces the protrusion 155 of the light guide plate 150 and the diffusing layer 165 faces the surface of the reflection plate 170.

In the embodiment, a frictional coefficient between the light guide plate 150 and the diffusing plate 160 refers to "CF1", and a frictional coefficient between the diffusing plate 160 and the reflection plate 170 refers to "CF2". In the comparative example, a frictional coefficient between the light guide plate 150 and the diffusing plate 160 refers to "CF3", and a frictional coefficient between the diffusing plate 160 and the reflection plate 170 refers to "CF4". The "CF1" is smaller than the "CF3" and the "CF2" is smaller than the "CF4". In general, a frictional coefficient of an object depends on the material of the object or surface roughness.

Since the surface of the protection layer 163 of the diffusing plate 160 is smoother than that of the protrusion 155 of the light guide plate 150, the frictional coefficient of the structure in the embodiment is smaller than that of the structure in the comparative example. Further, since the surface of the reflection plate 170 is smoother than that of the diffusing layer 165 of the diffusing plate 160, the frictional coefficient of the structure in the embodiment is smaller than that of the structure in the comparative example. Accordingly, in the embodiment, the pattern formed on the base surface of the light guide plate 150 may be shaped as at least one convex lens as shown in FIG. 6, or as at least one concave lens as shown in FIG. 7. The pattern may also have other shapes.

As such, the structure of a liquid crystal display according to an embodiment may prevent a stain from occurring on the liquid crystal panel 110 by the optical diffusing and scattering characteristics of the diffusing plate 160 even though the reflection plate 170 has a stain. Further, since in an embodiment of the present invention light reflected again by the step portions is blocked by the optical diffusing and scattering characteristics of the diffusing plate 160 even though the bottom cover having structural steps, such as the foaming portions FP1 and FP2 shown in FIG. 2, is used, a stain may be prevented from occurring on the liquid crystal panel 110. Further, according to an embodiment of the present invention, a frictional force between the light guide plate 150 and the diffusing plate 160 may be lowered. Accordingly, in spite of forming a specific pattern on the surface of the light guide plate 150 or the reflection plate 170 to enhance functionality, a problem, such as a scratch, may be solved.

Figure 8:
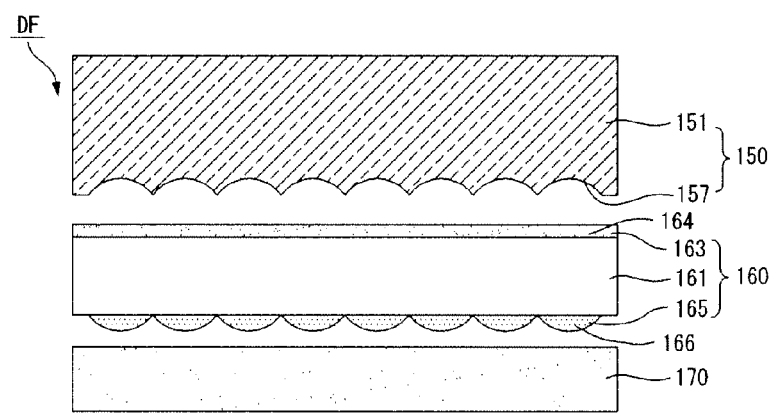
FIG. 8 is an enlarged cross section view illustrating region "DF" shown in FIGS. 1 and 2 according to an embodiment of the present invention.
Figure 9:
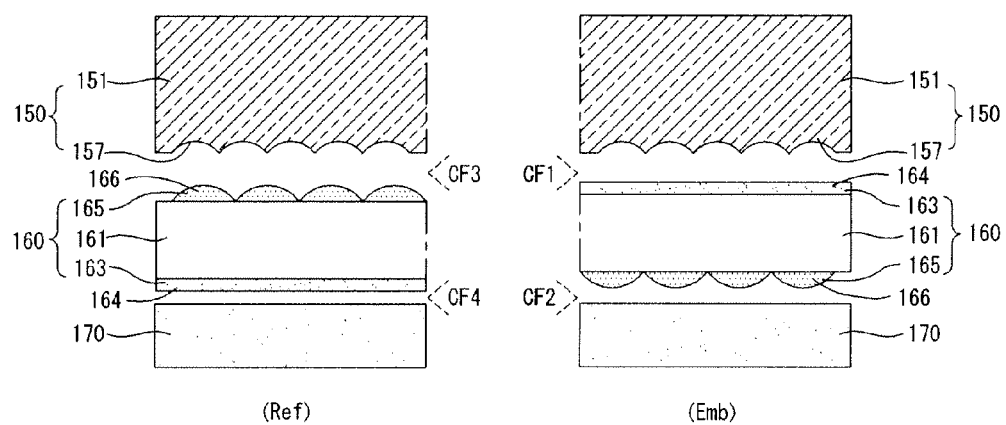
FIG. 9 is a view illustrating a structure located at region "DF".

FIG. 8 is an enlarged cross section view illustrating region "DF" shown in FIGS. 1 and 2 according to an embodiment of the present invention, and FIG. 9 is a view illustrating a structure located at region "DF".

Referring to FIG. 8, the light guide plate 150 includes a base portion 151 and at least one depressed portion 157 that is depressed from the base surface of the base portion 151. The base portion 151 and the depressed portion 157 may be formed of polymethylmethacrylate ("PMMA"), but not limited to. The base portion 151 is formed of the same material as that of the depressed portion 157 so that the upper surface is flat and the lower surface has the depressed portion 157. The depressed portion 157 of the light guide plate 150 is a pattern to enhance functionality of the light guide plate 150 and its cross section may be substantially shaped as a semicircle, but not limited to.

The diffusing plate 160 is positioned between the light guide plate 150 and the reflection plate 170. The diffusing plate 160 includes a base film 161, a protection layer 163 that is formed on a surface of the base film 161 and faces the light guide plate 150, and a diffusing layer 165 that is formed on the other surface of the base film 161 and faces the reflection plate 170. Each of the base film 161, the protection layer 163, and the diffusing layer 165 may be formed of a resin, such as acrylic, urethane, or polyester, but not limited to. The base film 161, the protection layer 163, and the diffusing layer 165 may be formed of the same material, but not limited to. First diffusing particles 166 may be contained in the diffusing layer 165 and second diffusing particles 164 may be contained in the protection layer 163. Each of the first diffusing particles 166 is larger in size than each of the second diffusing particles 164. Accordingly, the surface of the diffusing layer 165 may be formed to be protruded more than the surface of the protection layer 163.

FIG. 9(Ref) is a cross section view illustrating part of a backlight unit according to a comparative example, and FIG. 9(Emb) is a cross section view illustrating part of a backlight unit according to an embodiment of the present invention.

Referring to FIG. 5, the comparative example and the present embodiment are identical to each other in that the diffusing plate 160 included in the backlight unit is positioned between the light guide plate 150 and the reflection plate 170, but are different from each other in the structure of the diffusing plate 160.

In the comparative example, the diffusing plate 160 is formed such that the protection layer 163 faces the surface of the reflection plate 170 and the diffusing layer 165 faces the depressed portion 157 of the light guide plate 150. On the contrary, in the embodiment, the diffusing plate 160 is formed such that the protection layer 163 faces the depressed portion 157 of the light guide plate 150 and the diffusing layer 165 faces the surface of the reflection plate 170.

In the embodiment, a frictional coefficient between the light guide plate 150 and the diffusing plate 160 refers to "CF1", and a frictional coefficient between the diffusing plate 160 and the reflection plate 170 refers to "CF2". In the comparative example, a frictional coefficient between the light guide plate 150 and the diffusing plate 160 refers to "CF3", and a frictional coefficient between the diffusing plate 160 and the reflection plate 170 refers to "CF4". The "CF1" is smaller than the "CF3" and the "CF2" is smaller than the "CF4". In general, a frictional coefficient of an object depends on the material of the object or surface roughness.

Since the surface of the protection layer 163 of the diffusing plate 160 is smoother than that of the depressed portion 157 of the light guide plate 150, the frictional coefficient of the structure in the embodiment is smaller than that of the structure in the comparative example. Further, since the surface of the reflection plate 170 is smoother than that of the diffusing layer 165 of the diffusing plate 160, the frictional coefficient of the structure in the embodiment is smaller than that of the structure in the comparative example.

As such, the structure of a liquid crystal display according to an embodiment may prevent a stain from occurring on the liquid crystal panel 110 by the optical diffusing and scattering characteristics of the diffusing plate 160 even though the reflection plate 170 has a stain. Further, since in an embodiment of the present invention light reflected again by the step portions is blocked by the optical diffusing and scattering characteristics of the diffusing plate 160 even though the bottom cover having structural steps, such as the foaming portions FP1 and FP2 shown in FIG. 2, is used, a stain may be prevented from occurring on the liquid crystal panel 110. Further, according to an embodiment of the present invention, a frictional force between the light guide plate 150 and the diffusing plate 160 may be lowered. Accordingly, in spite of forming a specific pattern on the surface of the light guide plate 150 or the reflection plate 170 to enhance functionality, a problem, such as a scratch, may be solved.

An embodiment of the present invention provides a liquid crystal display and a backlight unit that may remove a stain that may be generated on a liquid crystal panel when a scratch occurs due to friction between a light guiding plate and a diffusing plate or light is reflected again because of structural steps formed at the bottom cover, thus enhancing display quality. Further, an embodiment of the present invention may screen a stain that may occur on the reflecting plate by the diffusing plate that causes light scattering due to the reversely assembled structure of the diffusing plate, and alleviate a scratch that may occur due to low roughness of the diffusing layer formed on the diffusing plate, and resultantly, friction with the pattern formed on the light guide plate.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A liquid crystal display comprising:
   a liquid crystal panel;
   a light guide plate that transfers light from a light source to the liquid crystal panel and has a pattern formed on a base surface;
   a reflection plate that is positioned under the light guide plate and seated on a bottom cover; and
   a diffusing plate that is positioned between the light guide plate and the reflection plate, the diffusing plate comprising a base film, a protection layer formed on a surface of the base film to face the light guide plate and a diffusing layer formed on the other surface of the base film to face the reflection plate,
   wherein the surface of the diffusing layer is formed to be protruded more than the surface of the protection layer,
   wherein the light guide plate and the diffusing plate point contact each other,
   wherein the pattern is shaped as a semicircle that is protruded outside of the base surface,
   wherein the diffusing layer is shaped as a semicircle that is protruded outside of the base surface,
   wherein the diffusing plate and the reflection plate are point contact each other.

2. The liquid crystal display of claim 1, wherein the diffusing layer contains first diffusing particles, and the protection layer contains second diffusing particles.

3. The liquid crystal display of claim 2, wherein each of the first diffusing particles is larger in size than each of the second diffusing particles.

4. The liquid crystal display of claim 1, further comprising:
   at least one optical sheet that is positioned between the liquid crystal panel and the light guide plate.

5. The liquid crystal display of claim 1, wherein the bottom cover includes a foaming portion that protrudes in an opposite direction of the reflection plate to have a step portion.

6. The liquid crystal display of claim 1, wherein the light source supplies light to an edge portion of the light guide plate.

7. A liquid crystal display comprising:
   a liquid crystal panel;
   a light guide plate that transfers light from a light source to the liquid crystal panel;
   a reflection plate that is positioned under the light guide plate and seated on a bottom cover; and
   a diffusing plate that is positioned between the light guide plate and the reflection plate, wherein the light guide plate, the reflection plate, and the diffusing plate point contact each other,
   wherein the diffusing plate comprising a base film, a protection layer formed on a surface of the base film to face the light guide plate and a diffusing layer formed on the other surface of the base film to face the reflection plate,
   wherein the surface of the diffusing layer is formed to be protruded more than the surface of the protection layer,
   wherein the light guide plate has a pattern,
   wherein the pattern is shaped as a semicircle that is depressed inside of the base surface,
   wherein the diffusing layer is shaped as a semicircle that is protruded outside of the base surface,
   wherein the diffusing plate and the reflection plate are point contact each other.

8. A backlight unit comprising:

a light guide plate that transfers light from a light source to an upper portion and has a pattern formed on a base surface;

a reflection plate that is positioned under the light guide plate and seated on a bottom cover; and a diffusing plate that is positioned between the light guide plate and the reflection plate, the diffusing plate comprising a base film, a protection layer formed on a surface of the base film to face the light guide plate and a diffusing layer formed on the other surface of the base film to face the reflection plate, wherein the surface of the diffusing layer is formed to be protruded more than the surface of the protection layer wherein the light guide plate and the diffusing plate point contact each other, wherein the pattern is shaped as a semicircle that is protruded outside of the base surface, wherein the diffusing layer is shaped as a semicircle that is protruded outside of the base surface, wherein the diffusing plate and the reflection plate are point contact each other.

9. The backlight unit of claim 8, wherein the diffusing layer contains first diffusing particles, and the protection layer contains second diffusing particles, wherein each of the first diffusing particles is larger in size than each of the second diffusing particles.

* * * * *